United States Patent [19]
Roach

[11] Patent Number: 5,135,346
[45] Date of Patent: Aug. 4, 1992

[54] HELICOPTER TRANSPORTER

[76] Inventor: William W. Roach, 5330 Pawnee Rd., Hobbs, N. Mex. 88240

[21] Appl. No.: 648,978

[22] Filed: Jan. 31, 1991

Related U.S. Application Data

[63] Continuation-in-part of Ser. No. 373,265, Jun. 27, 1989, abandoned.

[51] Int. Cl.⁵ .............................................. B64F 1/22
[52] U.S. Cl. ................................... 414/495; 180/904; 180/148; 254/10 R; 280/43.12; 414/917
[58] Field of Search ............... 414/495, 458, 917; 280/43.12, 43.23; 180/148, 904, 14.1; 254/10 R, 10 B, 8 C; 244/50

[56] References Cited

U.S. PATENT DOCUMENTS

| | | | |
|---|---|---|---|
| 3,009,711 | 11/1961 | White | 280/43.23 |
| 3,346,131 | 10/1967 | Lundell | 414/495 X |
| 3,468,440 | 9/1969 | Poole | 414/458 |
| 3,836,027 | 9/1974 | Gardner | 254/10 R X |
| 4,033,422 | 7/1977 | Benning | 414/495 X |
| 4,223,856 | 9/1980 | DiVencenzo | 180/904 X |
| 4,488,612 | 12/1984 | Patterson | 180/904 X |
| 4,522,548 | 6/1985 | Oswald et al. | 414/458 |
| 4,820,110 | 4/1989 | Efird | 414/458 |
| 4,832,560 | 5/1989 | Harp | 414/495 |
| 4,880,074 | 11/1989 | Matsumoto | 180/148 X |

FOREIGN PATENT DOCUMENTS

| | | | |
|---|---|---|---|
| 3723455 | 1/1989 | Fed. Rep. of Germany | 414/917 |
| 85771 | 4/1987 | Japan | 180/904 |

*Primary Examiner*—David A. Bucci
*Attorney, Agent, or Firm*—Richard C. Litman

[57] ABSTRACT

A maneuverable, wheeled, steerable vehicle is used for transporting helicopters of the type having landing skids. Such helicopters typically have cross bars under the body proper, with downward-curving arms to the skids. The invention includes two mutually parallel booms which extend from the vehicle body parallel and close to the ground. One of the booms is laterally movable toward and away from the other boom, which is fixed to the vehicle frame. In use, the booms are laterally spaced; the vehicle then goes forward to slide the booms under the cross bars of the helicopter body. Lift bars attached to each boom then raise the helicopter up so that the vehicle can transport it. The booms include a gang of small, hydraulically swiveled steering wheels at the ends distal the vehicle. Each lift bar swings upward on double parallel pivot arms at either end of each boom. The pivot axes are horizontal. The arms are of equal length to keep the lift bars horizontal. When the helicopter is lifted off the ground by the lift bars, the two large wheels on the main vehicle body are driven through a differential gear to move the vehicle and the helicopter. Power is hydraulic throughout; a small engine drives the hydraulic pump.

8 Claims, 3 Drawing Sheets

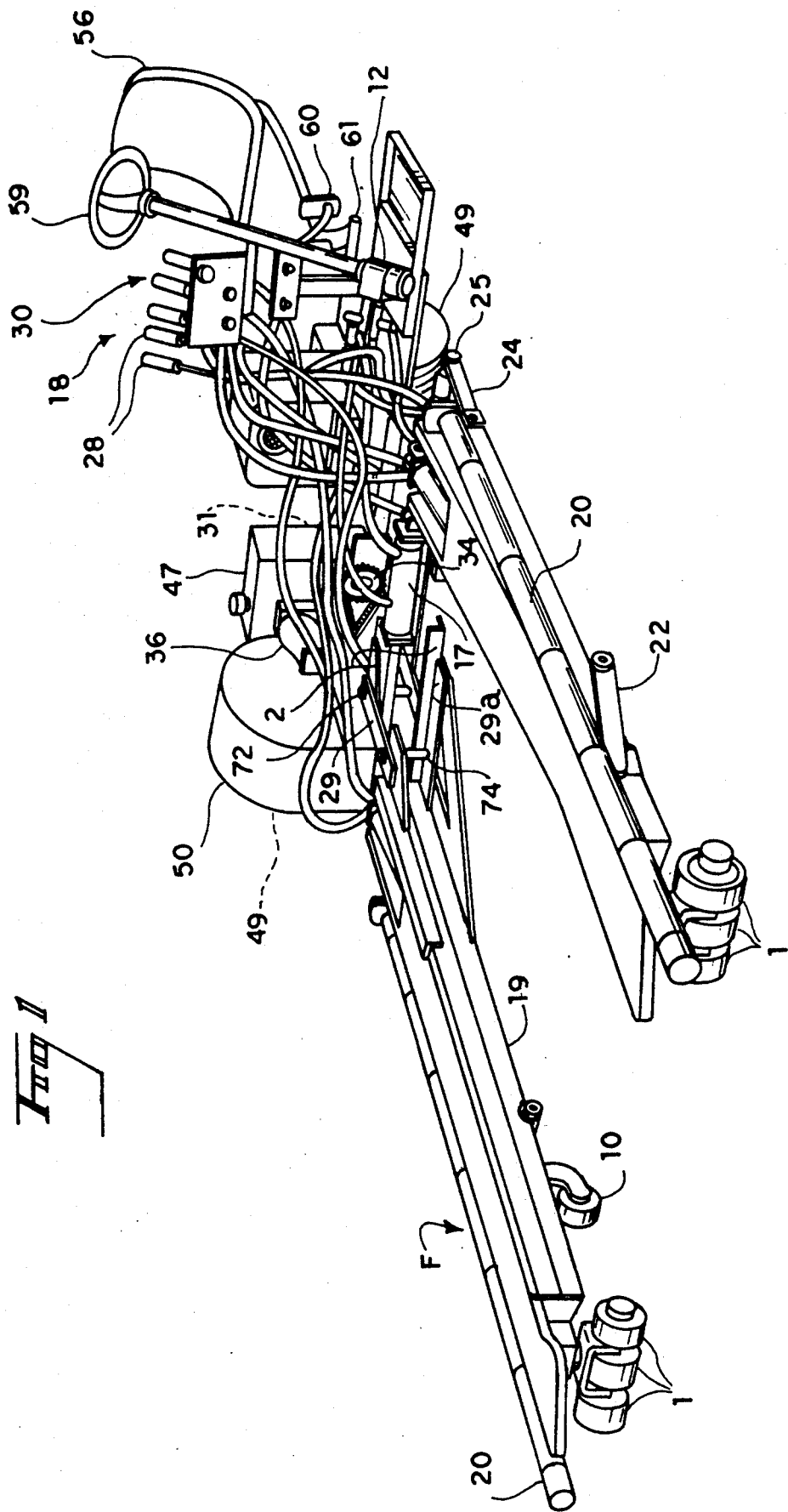

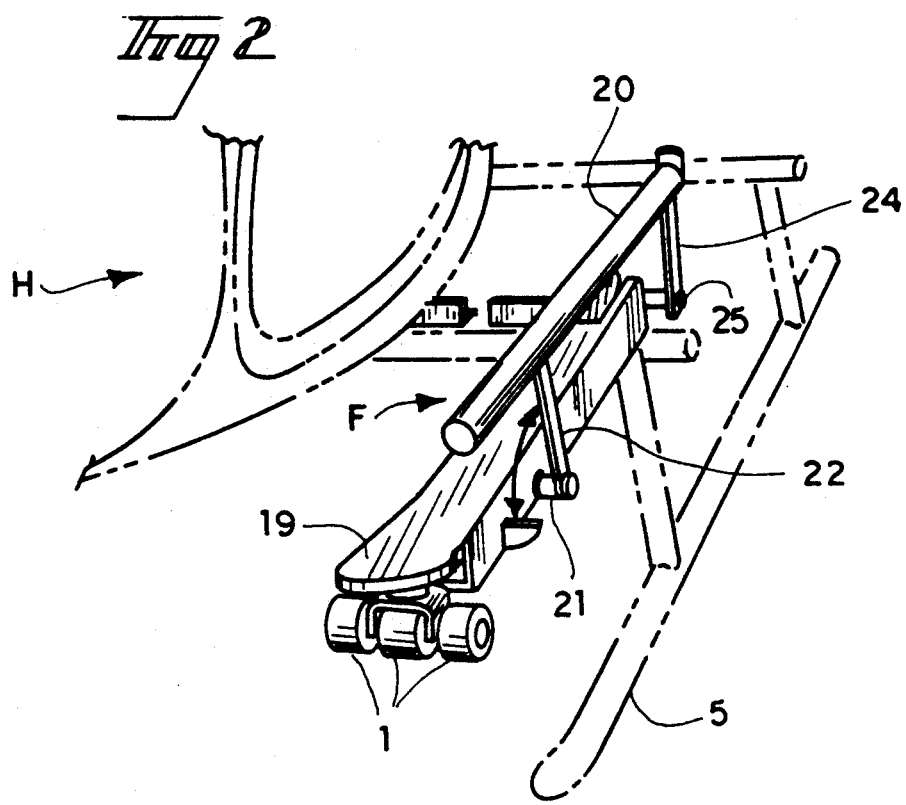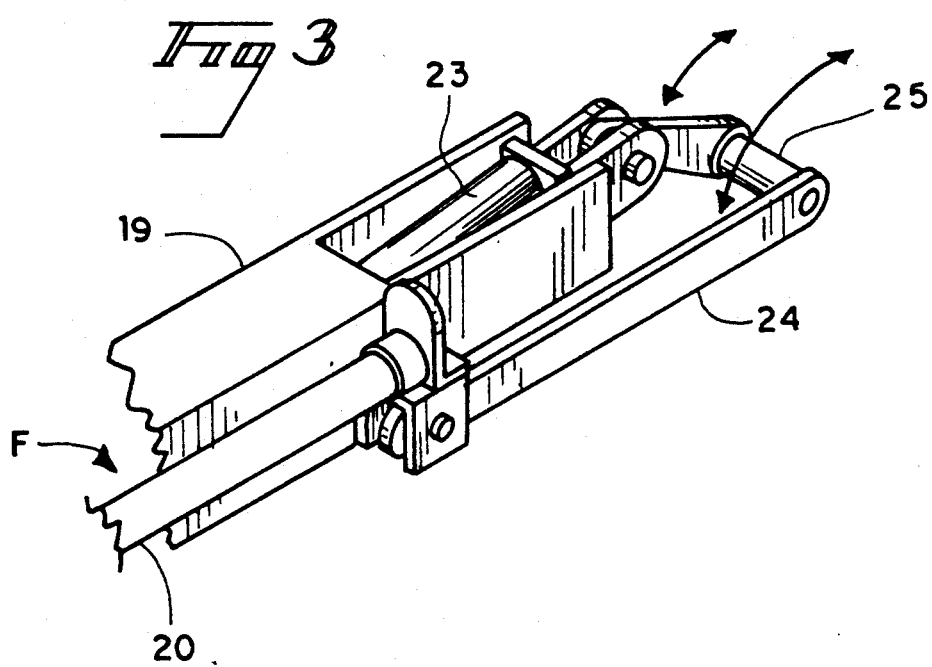

HELICOPTER TRANSPORTER

CROSS REFERENCE TO RELATED APPLICATION

The present application is a continuation-in-part of application Ser. No. 07/373,265, filed Jun. 27,1989, by the same inventor now abandoned.

FIELD OF THE INVENTION

The present invention relates to machines for moving a helicopter of the type having skids on downward extensions of cross bars under the body of the helicopter.

DESCRIPTION OF THE PRIOR ART

Several vehicles or machines for transporting helicopters having landing skids are known in the prior art. Such vehicles (carrying the operator) or machines (no operator on board) are useful for moving helicopters in and out of hangars and the like. All of them include wheels and a means of lifting the helicopter off the ground so that the friction of its skids bearing against the ground will not prevent moving the helicopter.

A number of prior art inventions lift on the skid directly. For example, the dolly of Patterson, disclosed in U.S. Pat. No. 4,488,612, drives wedges under the skids. Another dolly, that of Burnside (U.S. Pat. No. 4,516,744) attaches wheeled axles to the skids. U.S. Pat. No. 4,033,422 of Benning also teaches the use of wheels attached to the skids. All of these devices are awkward and slow to use, requiring jacking of the helicopter up into the air before attachment of the helicopter transporter.

A machine which is easier to use is disclosed in U.S. Pat. No. 4,2333,856 of DiVincenzo. This helicopter transporter employs a lift bar 6 attaches to the skids with special adapters 7, which must be permanently fastened to the skids (unless the proprietary skids happen to include convenient lifting points, in which case the lift bar 6 may have to be specialized to that particular type of helicopter). It also appears to be awkward to set up, as one must get under the helicopter to adjust the ends of the bar into the adapters.

As well as dollies, helicopter transporter vehicles are also known in the art. For Example, a towing tractor for airplanes, which includes an operator cab, is shown in Japanese Pat. No. 62-85771 of Kuribayashi.

An improved helicopter transporter dolly is disclosed in the Tug-a-Lug brochure, which is to be found as Exhibit 1 in the file wrapper of the parent application of the present application. (The parent is application Ser. No. 07/373,265, filed Jun. 27, 1989, by the same inventor.) The brochure is also available from Tug-a-Lug, Inc., 41614 102nd Street East, Lancaster, CA. 93535; phone (805) 944-1910.

The Tug-a-Lug brochure shows the "D" series of dollies, which employ a double frame arrangement. A lower frame, which is rectangular, includes four wheels. The front wheels are attached to steering gear like that of an automobile, having a cross arm connected to either wheel; steering is accomplished by moving a boom extending from the lower frame, which moves the cross arm. The upper frame is quite similar to the lower, a rectangle of the same general dimensions. It rests directly above the lower frame. The upper frame is connected to the lower by four lift arms of equal length, each of which pivots on the sides of both the lower and upper frames. The geometry allows the upper frame to swing up away from the lower frame.

In use, the dolly is wheeled under a helicopter. Once the lower frame is in position, the upper frame is powered to rise up on the four lift arms and lift the helicopter off the ground. The helicopter is then conveniently moved about.

The Tug-a-Lug dolly has several drawbacks. First, the upper frame does not bear directly against the cross bars under the helicopter belly, to the ends of which the skids proper are attached. Rather, the frame contains 6 or 8 sockets, each of which accepts an adapter. The adapters clamp onto or otherwise hold the skids or cross bars are certain points. Thus, the dolly must be very carefully positioned if the adapters are to mate properly with the particular places on the helicopter where they fit.

Also, every model of helicopter requires a different set of adapters. This means that different, particular sets of adapters must be obtained if several different helicopters are to be moved. The numerous and varies adapters are liable to mixing, confusion, and loss.

Moreover, the Tug-a-Lug dolly is not suitable for moving certain types of helicopters which have protruding items on the belly. Military and police helicopters especially are likely to have searchlights, machine guns, and other paraphernalia emplaced between the skids. The Tug-a-Lug dolly will not pass these to reach the lifting position, because of the cross pieces on both the upper and lower frames.

In addition to the above drawbacks, the Tug-a-Lug is adaptable to only a narrow range of helicopter sizes, because the upper frame has a fixed width and length. If a helicopter transporter of this type is built for a small helicopter, then it will be too narrow to stably support a wide one; and if built for a wide helicopter, it will not fit a small one.

None of the above inventions and patents, taken either singly or in combination, is seen to describe the instant invention as claimed.

The prior art is not seen to disclose a maneuverable helicopter transporter for helicopters with landing skids, which is adapted to move various sizes of helicopters without careful placement and without the need for special adapters for each type of helicopter. Neither does it disclose a helicopter transporter which is adapted to avoid hitting objects under the belly of a helicopter, nor one which can stably lift helicopters of different widths.

Accordingly, one object of the present invention is a helicopter transporter which can transport a wide variety of helicopters without the use of adapters.

Another object is a helicopter transporter which lifts on the body or cross bars of a helicopter, not on the skids.

A further object is a helicopter transporter which is simple to operate and easy to emplace for lifting the helicopter.

A final object is a helicopter transporter which has variable distance between the lifting elements.

These and other objects of the present invention will become readily apparent upon further review of the following specification and drawings.

SUMMARY OF THE INVENTION

The present invention is a maneuverable, wheeled, steerable vehicle for transporting helicopters of the type having landing skids. Such helicopters typically have cross bars under the body proper, with downward-curving arms to the skids. The invention includes two mutually parallel booms which extend from the vehicle body parallel and close to the ground. One of the booms is laterally movable toward and away from the other boom, which is fixed to the vehicle frame. In use, the booms are laterally spaced; the vehicle then goes forward to slide the booms under the cross bars of the helicopter body. Lift bars attached to each boom then raise the helicopter up so that the vehicle can transport it. The booms include a gang of small, hydraulically swiveled steering wheels at the ends distal the vehicle. Each lift bar swings upward on double parallel pivot arms at either end of each boom. The pivot axes are horizontal. The arms are of equal length to keep the lift bars horizontal. When the helicopter is lifted off the ground by the lift bars, the two large wheels on the main vehicle body are driven through a differential gear to move the vehicle and the helicopter. Power is hydraulic throughout; a small engine drive the hydraulic pump.

BRIEF DESCRIPTION OF THE DRAWINGS

FIG. 1 is a perspective overview of the present invention, with the booms and lift bars extended toward the viewer.

FIG. 2 is a schematic view showing a phantom helicopter lifted off of the ground on the lift bars.

FIG. 3 is a detail perspective view of a part of the helicopter lifting mechanism.

Similar reference characters denote corresponding features consistently throughout the attached drawings.

DETAILED DESCRIPTION OF THE PREFERRED EMBODIMENT

Figure 4:
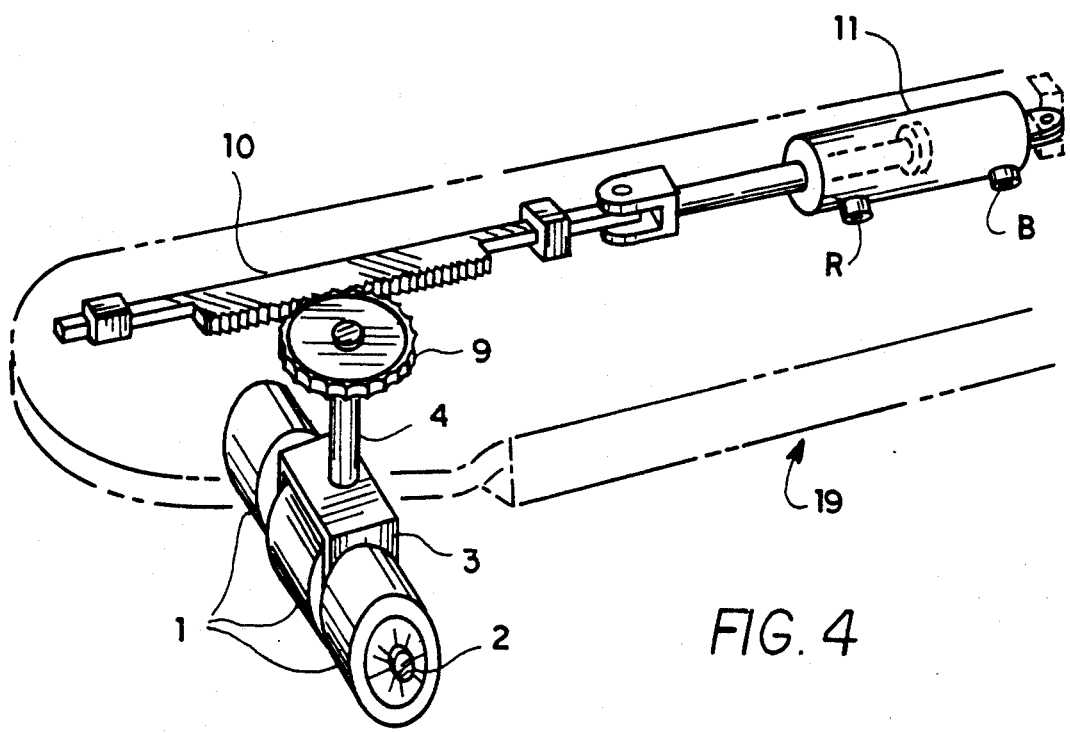
FIG. 4 shows the steering mechanism for the ganged front wheels.

The helicopter transporter vehicle of the present invention is seen in overview in FIG. 1. The major parts of the vehicle are: a steel frame 2 which the other parts are attached (hidden by various other parts in FIG. 1); parallel booms 19 of heavy steel tubing, each about seven feet long; lift bars 20 which contact the helicopter in lifting it; steering wheels 1 at the ends of the booms 19; and the larger rear drive wheels 49.

Power for the helicopter transporter vehicle is supplied by a small gasoline or diesel engine 39 which drives a hydraulic pump 31 through a chain drive. Hydraulic fluid from a reservoir 47 is drawn to the pump 31 and sent through a pressure regulator valve (not shown) to a console 18, from whence it is distributed to the various mechanisms through hydraulic hoses and tubes. The console 18 contains valves 30 and respective actuating handles 28. All operating power and control in the helicopter transporter is hydraulic.

To aid in reference, in FIG. 1 the end toward the viewer is the front end; the left and right sides correspond to the arms or hand of a person facing toward the front.

A drive wheel 49 is visible on the left side of the helicopter transporter in FIG. 1. Another drive wheel is hidden under the fender 50 on the right. The drive wheels 49 are driven on shafts from a differential gear located between them; a light truck rear axle and wheels may conveniently be used. The differential gear of the wheels is driven through a 4:1 reduction gearbox 36 by a reversible hydraulic motor 34. Fluid is supplied to the motor 34 from a bidirectional valve 30 on the console 18. Fluid can be sent to the motor 34 at a varying rate by controlling the valve, and in two directions, for forward and reverse motion at various speeds.

Directly behind the console 18 on the left side of the vehicle is a seat 56 for the operator. A steering wheel 59 is positioned in front of the operator next to the console 18. While sitting in the seat 56 the operator can depress left and right pedals 60 and 61 with his or her feet. Each pedal is connecteed to an hydraulic master cylinder which connects to a drum brake (not shown) in the respective left or right wheel. The ability to brake each wheel independently aids in steering the helicopter transporter vehicle.

The operator's position is off to one side so that the helicopter transporter can be driven up to a helicopter from the rear of the helicopter, without the operator's head interfering with the helicopter tail. Approach from the front is not practical, due to headlamps and other things which often protrude from the front of the helicopter.

Steering of the helicopter transporter vehicle is accomplished by swiveling the two gangs of front wheels 1 at the front end of each boom 19. The control is by the steering wheel 59, which connects through a shaft to a rotary valve 12, which can send fluid to either of two hydraulic cylinders 11 connected to a mechanism which steers the front wheels 1.

The steering gear proper is inside the booms 19, which are hollow. The gear is not visible in FIG. 1, but is shown in FIG. 4. The booms are preferably of 5"×5" square steel tubing with a ¼" wall.

Inside either boom 19 is the hydraulic cylinder 11 fastened to the inside wall of the boom 19 for supplying steering force. The cylinder 11 is double acting and has ports to both the rod end and the blind end of the cylinder space, on either side of the piston. These are labeled as R and B respectively in FIG. 4. The piston rod is linked to a rack 10 sliding in a guide welded to the inside wall of the boom 19; the rack teeth engage the teeth of a round gear 9 to a vertical spindle 4.

Fluid from the valve 12, entering the rod side of the cylinder 11 through the port R, exerts pressure on the rod side of the piston. When the piston moves toward the blind end of the cylinder 11 in response to that pressure, the fluid trapped in the blind exits through the other port B. A "deadline" hose from that port B leads to the B port of the other cylinder 11 inside the other boom. Thus, one cylinder's motion causes opposite motion in the other cylinder and both spindles 4 turn in response to the motions of the steering wheel 59.

Welded to the part of the spindle 4 extending below the lower surface of the boom 19 is a fork-type yoke 3. The yoke 3 supports front steering wheels 1. To keep the boom 19 profile low, the wheels 1 are only six inches in diameter. To give sufficient floatation and load bearing, they are multiplied to three wheels 1 on each yoke 3, left and right. All three ride on an axle 2 passed through the yoke 3. The wheels 1 preferably have a solid polyurethane tread for long life.

The left boom is welded directly to the frame 2. The right boom is hingedly attached to the frame 2 by three swing arms 29, 29a, made of strap steel 4" wide and ½" thick. There are two lower arms 29, 29a, and one upper arm 29; looked at from above, they appear to form a right triangle, approximately. The rear end of each arm 29 is pivotally attached to the frame 2 by a bolt 72. The front ends of arms 29 are connected to the right boom via suitable bracing as shown in FIG. 1 and to arm 29a which is a part of the bracing, by a similar pivot bolt 74. The bolt-to-bolt distance on each arm 29 is the same, 20 inches. By this geometry, the right boom can swing from side to side on the two arms 29 while maintaining its own orientation, due to the fairly close spacing of arm 29a with frame 2, arm 29a being firmly affixed to the right boom 19, all as shown in FIG. 1. The arms 29 will neither pitch, yaw, nor roll, only swing in a circle of 20" radius. Due to the large radius, the motion for small arcs approximates a linear side-to-side motion.

A double-acting cylinder 17, mounted between the frame 2 and the boom 19, controls this motion. The two sides of the piston of cylinder 17 are connected to a two-way valve 30 on the console 18. Fluid from the valve 30 drives the right hand boom 19 toward or away from the left-hand boom 19.

This motion is needed for adjusting the booms to various helicopters, which may have belly cross bars of different widths, and which may have various spotlights, machine guns, or other items suspended at places on the belly.

The force of the cylinder 17 on the boom 19 also exerts a force on the front wheels 1 of the boom 19. This force is generally perpendicular to their direction of rolling, and great friction results. To overcome this friction problem, a castor wheel 16 is employed on the right-hand boom 19. The castor wheel 16 is extendible from the bottom of the boom by hydraulic power; the main wheels 1 are thereby lifted off the ground and the boom 19 can easily move laterally to adjust the distance between the booms 19.

Once the distance between the booms is adjusted and the vehicle driven into position, with the booms 19 under the cross bars of the helicopter, the helicopter can be lifted for transport. The helicopter is lifted up on lift bars 20 as shown in FIG. 2, where a portion of the helicopter H with skid S (both depicted in phantom) is shown lifted on the left lift bar 20.

The lift bars 20 alongside either boom 19 are pivotally mounted on front lift arms 22 and rear lift arms 24 which rotate about hinges 21 in front and axle 25 in the rear. The force to lift the helicopter is provided by left and right cylinders 23, which are jointly supplied with hydraulic fluid from a single valve 30 on the console 18.

Only the rear lift arm 24 is powered; the front lift arm 22 is an idler. The lifting mechanism of the left-hand boom 19 is shown in FIG. 3. (The right-hand boom mechanism is a mirror image of that of FIG. 3.) Axle 25 is rotatably fixed to the frame 2 (not shown). Cylinder 23, nestled in an opening in boom 19. The hidden inner end of the cylinder 23 is fixed to the inside of the boom. The outer end is pivoted on an extension of the axle 25, in such a way that the axle 25 rotates when the cylinder 23 pushes against it. Then the rear lift arm swings up and raises the lift bar 20 and the helicopter sitting on it.

The lift bars 20 are preferably covered with a nonskid friction surface covering or coating F, shown in the figures. For example, the bars may be painted with or dipped in plastic, as are pliers handles and the like. Or, they may be wrapped in suitable fabric. This coating F should also be non-marring. With it, the helicopter transporter may be used without fear of scraping paint from the helicopter or of the helicopter suddenly lurching off the lift bars 20.

The helicopter transporter includes a simple electrical system of the ordinary 12 volt type, comprising a generator or alternator, a starter for the engine, and a battery. The 12-volt system may be used for auxiliary equipment like headlights. In addition, a separate 28 volt alternator may be installed for charging the batteries of helicopters, which have 28-volt systems.

The present invention is thus seen to have the following advantages: it is easy to emplace before lifting the helicopter, because the lift bars 20 can ordinarily contact the cross bars of the helicopter belly in almost any position; it is adapted to helicopters having belly-mounted paraphernalia in having no cross members between the booms 19 or the lift bars 20; and the variable distance between the booms 19 and lift bars 20 make it adaptable to many aircraft.

It is to be understood that the present invention is not limited to the sole embodiment described above, but encompasses any and all embodiments within the scope of the following claims.

I claim:

1. A helicopter transporter comprising:

a frame;

drive wheels rotatably mounted on said frame, said drive wheels having parallel axes of rotation;

an elongated fixed boom rigidly attached to said frame and extending horizontally away from said frame close to the ground in a direction perpendicular to the axes of said drive wheels;

an elongated movable boom extending horizontally away from said frame close to the ground and parallel to said fixed boom, said movable boom joined to said frame by a mechanism allowing translational motion of said movable boom toward and away from said fixed boom;

a rotatable first steering wheel mounted on said fixed boom distal said frame;

a rotatable second steering wheel mounted on said movable boom distal said frame;

steering gear adapted to controllably rotate the first and second steering wheels simultaneously for steering the vehicle;

lift bars adjacent said fixed boom and said movable boom, said lift bars vertically movable to raise a helicopter resting thereupon upward;

power means for rotating said drive wheels, moving said lift bars, and moving said movable boom; whereby said helicopter transporter may be driven beneath a helicopter, said lift bars used to lift the helicopter off the ground, and the helicopter transported.

2. A helicopter transporter according to claim 1, including on each boom:

a rear lift arm rotatably attached to the boom for rotation about a horizontal axis perpendicular to the boom, said rear lift arm pivotally attached to one of said lift bars;

a front lift arm rotatably attached to the boom for rotation about a horizontal axis perpendicular to the boom, said front lift arm pivotally attached to said one of said lift bars;

said rear lift arm and said front lift arm equal in length;

said rear lift arm and said front lift arm parallel; and the boom and said lift bar parallel; whereby said one of said lift bars may move up away from the boom as the two lift arms rotate together.

3. A helicopter transporter according to claim 1, wherein said mechanism includes at least a pair of swing arms connecting said frame to said movable boom, each of said swing arms including a frame pivot and a boom pivot located a radius away from said frame pivot, said swing arms being parallel, the frame pivots of the swing arms lying in a line normal to the length of said fixed boom, there being a third swing arm affixed to said movable boom and connected to said boom pivot whereby said pair of swing arms are moved in a circular path defined by said radius, so that said movable boom may be moved toward and away from said fixed boom.

4. A helicopter transporter according to claim 1, including friction coating on said lift bars.

5. A helicopter transporter according to claim 1, including a seat for an operator, a steering wheel in front of said seat connected to said steering gear for steering said helicopter transporter, and brake pedals connected to brakes on said drive wheels.

6. A helicopter transporter according to claim 5, wherein said seat is offset to one side to allow the operator to avoid a tail boom of the helicopter.

7. A helicopter transporter according to claim 5, wherein said steering wheel is hydraulically connected to said steering gear, and said first steering wheel and said second steering wheel are hydraulically connected for simultaneous turning.

8. A helicopter transporter according to claim 1, wherein said power means further comprises:
- a self contained engine;
- a reservoir for hydraulic fluid;
- a pump drawing fluid from said reservoir, said pump mechanically connected to said engine to produce pressure in the fluid when said engine supplies power to said pump;
- hydraulic lines or hoses for delivery of pressurized fluid to and from said pump to said wheels, said lift bars, and said movable boom; and
- values in said lines or hoses for regulating delivery of fluid.

* * * * *